(12) United States Patent
Kerling et al.

(10) Patent No.: US 11,155,434 B2
(45) Date of Patent: Oct. 26, 2021

(54) METHOD FOR WINDING A WINDING MATERIAL, COMPUTER PROGRAM PRODUCT, CONTROLLER AND WINDING MACHINE

(71) Applicant: Siemens Aktiengesellschaft, Munich (DE)

(72) Inventors: Sebastian Kerling, Erlangen (DE); Björn Seelinger, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 239 days.

(21) Appl. No.: 16/414,319

(22) Filed: May 16, 2019

(65) Prior Publication Data

US 2019/0352123 A1 Nov. 21, 2019

(30) Foreign Application Priority Data

May 18, 2018 (EP) .................................. 18173096

(51) Int. Cl.
*B65H 59/00* (2006.01)
*B65H 59/18* (2006.01)
(Continued)

(52) U.S. Cl.
CPC ............. *B65H 59/18* (2013.01); *B65H 26/00* (2013.01); *B65H 59/40* (2013.01); *H02K 15/0025* (2013.01)

(58) Field of Classification Search
CPC ........ B65H 26/00; B65H 54/10; B65H 59/04; B65H 59/06; B65H 59/12; B65H 59/18;
(Continued)

(56) References Cited

U.S. PATENT DOCUMENTS

2013/0026278 A1 1/2013 Bitterolf et al.
2015/0175382 A1* 6/2015 Seifert ................... B65H 57/16
242/397
(Continued)

FOREIGN PATENT DOCUMENTS

CN 102556737 7/2012
CN 105336972 2/2016
(Continued)

OTHER PUBLICATIONS

Office Action dated Jun. 30, 2020 issued in Chinese Patent Application No. 201910414349.2.

*Primary Examiner* — Emmanuel M Marcelo
(74) *Attorney, Agent, or Firm* — Cozen O'Connor

(57) ABSTRACT

Computer program product, controller, winding machine and method for winding a winding material from a supply device onto a winding body of a winding machine, wherein the winding material is provided from a supply roller and wound onto the winding body via at least one deflection roller, where an actual winding tension of the winding material is set to a setpoint winding tension depending on a position-dependent compensation signal, stored in a storage unit, to compensate for a changeable free length, resulting from a non-circular cross section of the winding material, of the winding material between the deflection roller and the winding body, whereby due to the fact that the actual winding tension is set to the setpoint winding tension via the position-dependent compensation signal, which is already stored in the storage unit prior to the winding, the computational load for the setting can be reduced.

20 Claims, 2 Drawing Sheets

(51) Int. Cl.
*B65H 26/00* (2006.01)
*B65H 59/40* (2006.01)
*H02K 15/00* (2006.01)

(58) Field of Classification Search
CPC .... B65H 59/385; B65H 59/387; B65H 59/40; H01F 41/071; H01F 41/094; H01M 10/0409
See application file for complete search history.

(56) References Cited

U.S. PATENT DOCUMENTS

2016/0036086 A1* 2/2016 Lee .................... B65H 23/1806
242/412
2018/0162682 A1 6/2018 Karl et al.

FOREIGN PATENT DOCUMENTS

| | | | |
|---|---|---|---|
| CN | 206886342 U | 1/2018 | |
| DE | 4104087 A1 * | 8/1991 | .......... H01F 41/094 |
| EP | 2485227 | 8/2012 | |
| EP | 3333106 | 6/2018 | |
| WO | WO2018029129 | 2/2018 | |

\* cited by examiner

METHOD FOR WINDING A WINDING MATERIAL, COMPUTER PROGRAM PRODUCT, CONTROLLER AND WINDING MACHINE

BACKGROUND OF THE INVENTION

1. Field of the Invention

The present invention relates to a winding machine, a controller for the winding machine, a method and to a computer program product for winding a winding material from a supply device onto a winding body having a non-circular cross section.

2. Description of the Related Art

When winding a winding material, in particular in the case of a wire or a film, onto a winding body, a winding tension is regularly applied to the winding material. In this case, the winding tension corresponds to the force (per cross-sectional surface area) with which the winding material is wound on the winding body. In modern devices for winding a winding material, it is possible to set the winding tension. In other words, the winding tension is the tensile stress of the winding material.

EP 2 485 227 A1 describes a wire-winding machine and a controller for such a wire-winding machine.

In earlier, unpublished application EP 16 203 431.8 by the applicant, a method for winding a winding material from a supply device on a winding body having a non-circular cross section is described, in which the winding material is provided from the supply device and is wound on the winding body, where the winding tension of the winding material can be set to an intended winding tension, and where to set the winding tension, a rotational speed of the winding body is controlled or regulated, and/or the winding tension is set to the intended winding tension by a setting unit.

SUMMARY OF THE INVENTION

Against this background, it is an object of the present invention to improve the winding of a winding material onto a winding body having a non-circular cross section.

This and other objects and advantages are achieved in accordance with the invention by a method for winding a winding material from a supply device on a winding body, having a non-circular cross section, of a winding machine, where the method comprises, providing the winding material from the supply roll, and winding the winding material provided from the supply device onto the winding body via at least one deflection roller, where an actual winding tension of the winding material is set to a setpoint winding tension depending on a position-dependent compensation signal, stored in a storage unit, to compensate a changeable free length, resulting from the non-circular cross section of the winding material, of the winding material between the deflection roller and the winding body.

Due to the fact that the actual winding tension is set to the setpoint winding tension via the position-dependent compensation signal, which is already stored in the storage unit prior to the winding, the computational load for the setting can be reduced, in particular in comparison with solutions in which the compensation signal is calculated during winding, i.e., online. Due to the reduced computational load, the controller, which sets the actual winding tension, can be adjusted or selected accordingly. A controller with lower computational capacities may be used, in particular in comparison with solutions in which the compensation signal is calculated during winding. This advantageously saves costs.

When using an identical controller, the cycle times can be advantageously reduced. Accordingly, the position-dependent compensation signal is particularly calculated beforehand for an entire winding procedure or for a partial winding procedure and stored in the storage unit. The calculated compensation signal is in particular stored in a table or polynomial table, also called cam disk.

By virtue of the present method, the process speed in an existing mechanical system of the winding machine can be advantageously increased. Furthermore, the process quality in an existing mechanical system of the winding machine is can be increased by virtue of the present method.

Free length of the winding material in particular denotes the web length of the winding material between the deflection roller and the winding body. In the case of a plurality of deflection rollers provided in the winding machine, the deflection roller connected immediately upstream of the winding body is meant in particular. By way of example, the free length of the winding material is the web length between the contact point of the winding material on the deflection roller and the contact point of the winding material on the winding body.

The winding tension is understood to mean the tension, in particular the mechanical tension, of the winding material during winding. The winding tension is defined in particular as the force that acts on the winding material perpendicular to its cross-sectional surface area, divided by the cross-sectional surface area.

The setpoint winding tension is understood to mean the winding tension at which the winding material is intended to be wound onto the winding body. The setpoint winding tension may also be referred to as an intended winding tension. The setpoint winding tension may be represented as a function of the alignment of the winding body. By way of example, this is relevant in the case of winding of a wire as winding material around a square winding body, in order to achieve an optimized result.

A non-circular cross section is understood to mean a cross section that deviates from a circular form. This means that the winding material has a non-constant diameter, i.e., at least two different diameters. By way of example, such a winding body with a non-circular cross section is elliptical or rectangular.

By way of example, battery cells or film capacitors are preferably produced using the present method. A supply device is understood to mean in particular an apparatus for providing and/or storing the winding material in the winding machine. The supply device preferably comprises a supply roller and/or a transport device.

By way of example, the supply roller is a wire roller or a roller onto which film is rolled up. The winding body may be assigned a first rotational speed, whereas the supply roller may be assigned a second rotational speed, such that the supply roller provides the winding material at a speed proportional to the second rotational speed. The deflection roller is preferably understood to mean that deflection roller from which the winding material is guided to the winding body.

The winding tension may also be referred to as web tension or winding material tension. In the case of a winding procedure on the winding body having a non-circular cross section, the section between the contact point of the winding material on the winding body and the contact point of the winding material on the upstream deflection roller changes as the winding body rotates. This change, as in the present case, is referred to as a changeable free length of the winding material between the deflection roller and the winding body. The change in this distance between the contact points results in a change in the current winding tension, due to which the actual winding tension is also set to the setpoint winding tension by virtue of the present method. Setting is understood in the present case in particular to mean controlling or regulating. In addition, the changing contact point on the deflection roller and the non-constant circumference of the winder (over 360° in comparison with a circle) influences the change in the actual winding tension.

The actual winding tension is preferably constant, in particular during a winding cycle consisting of N rotations of the winding body. The actual winding tension should preferably be kept constant in the case of battery cell manufacture and the winding of capacitors. "Constant" should be understood to mean here that the winding tension, in particular at the contact point of the winding material, on the (in particular already wound) winding body remains the same during the winding procedure.

In particular, for this purpose, a controller of the winding machine controls or regulates a setting unit and/or a drive of the winding body. The setting unit comprises, for example, a variable winding material store and/or a settable winding material brake and/or a dancer roller. Examples of such a setting unit are described in the earlier application EP 16 203 431.8, the content of which is incorporated herein by reference in its entirety.

In accordance with one embodiment, the actual winding tension of the winding material is regulated to the setpoint winding tension depending on the position-dependent compensation signal for compensating the changeable free length of the winding material between the deflection roller and the winding body.

In accordance with a further embodiment, the position-dependent compensation signal is calculated depending on a respective determined position of the winding body for a simulated winding cycle consisting of N rotations of the winding body and stored in a table of the storage unit.

In accordance with a further embodiment, the position-dependent compensation signal is calculated depending on a respective determined position of the winding body for a simulated winding cycle consisting of N rotations of the winding body prior to the winding material being wound on the winding body and stored in a table of the storage unit.

The compensation signal is calculated beforehand, for example, via a simulation based on a simulated winding cycle consisting of N rotations of the winding body, and then stored in a table of the storage unit. The calculation of the compensation signal and the storage in the table of the storage unit occurs prior to the actual winding of the winding material on the winding body.

In accordance with yet a further embodiment, a polynomial table is used as the table for storing the position-dependent compensation signal. The polynomial table may also be referred to as a cam disk.

In accordance with a still further embodiment, the respective position of the winding body for the simulated winding cycle consisting of N rotations of the winding body is determined depending on a winding length of the winding material and a rotational speed of the winding body.

To determine the respective position of the winding body during the simulation using the simulated winding cycle, the winding length and the rotational speed are suitable input parameters for a precise determination.

In accordance with a further embodiment, the calculated position-dependent compensation signal is filtered via a filter of a predetermined filter order prior to storage in the table, and the filtered position-dependent compensation signal is then stored in the table of the storage unit.

The calculated compensation signal may accordingly be modified or filtered such that particular frequency spectra are eradicated and therefore no longer excited. A high-order filter with finite impulse response is in particular suitable for this purpose.

As a result, the process speed in an existing mechanical system of the winding machine can be advantageously greatly increased. The process quality in an existing mechanical system of the winding machine is furthermore also able to be greatly increased by virtue of the present embodiment.

In accordance with a further embodiment, a finite impulse response (FIR) filter having a particular filter order of at least M and a finite impulse response is used as filter. By way of example, the filter order M is between 1500 and 2000.

In accordance with a further embodiment, when the filtered position-dependent compensation signal is stored in the table, a transient response of the filter is taken into account and a filter dead time of the filter is compensated.

By virtue of the preliminary calculation of the compensation signal, the transient response of the filter and the resultant filter dead time are already able to be taken into account in the calculation of the compensation signal and/or storage thereof in the storage unit. This has a particularly advantageous effect when using high-order filters.

In accordance with a further embodiment, the respective position of the winding body for the simulated winding cycle consisting of N rotations of the winding body is determined depending on the winding length of the winding material, on the rotational speed of the winding body and the particular filter order of the filter in a predetermined resolution.

In accordance with a further embodiment, a rotational speed of the winding body is regulated to set the actual winding tension of the winding material to the setpoint winding tension.

In accordance with a further embodiment, the actual winding tension of the winding material is regulated to the setpoint winding tension by a setting unit.

The setting unit comprises in particular a winding material brake with settable braking power and/or a winding material store. The tension may also be introduced using a dancer system, using the drive of the winder and/or using the drive of a path axle that is involved. In this case, the winding material is guided via a deflection roller.

A winding material brake may advantageously be supplemented by further possibilities for setting the winding tension.

A winding material store has a multiplicity of deflection rollers, where the winding material is kept on a path of changeable length by the multiplicity of deflection rollers. By changing the position of at least one of the deflection rollers, it is possible to set the length of the path. The length of the web of winding material corresponds to the capacity of the winding material store. The position of the respective deflection roller is changed in particular by an actuator.

A winding material store may be combined with a dancer roller in order to compensate for slight fluctuations in the winding tension.

In accordance with a further embodiment, the actual winding tension of the winding material is regulated to the setpoint winding tension depending on the position-dependent compensation signal for setting an actual tensile force acting on the winding material to a setpoint tensile force.

In accordance with a further embodiment, an actual torque acting on the winding material during winding of the winding material on the winding body is set, in particular regulated, to a setpoint torque.

In accordance with a further embodiment, an actual torque acting on the winding material is regulated to a setpoint torque depending on the position-dependent compensation signal, stored in the storage unit, for compensating the changeable free length, resulting from the non-circular cross section of the winding material, of the winding material.

It is also an object of the invention to provide a computer program product that prompts the performance of the method as explained above for winding a winding material from a supply device onto a winding body having a non-circular cross section on a program-controlled apparatus.

A computer program product, such as a computer program means, for example, may be provided or delivered, for example, as a storage medium, such as a memory card, USB stick, CD-ROM, DVD, for example, or else in the form of a file downloadable from a server in a network. This may occur, for example, in a wireless communication network through the transmission of an appropriate file comprising the computer program product or the computer program means.

It is also an object of the invention to provide a controller for a winding machine, where the controller has a regulation unit that is configured, using drives and/or a setting unit, so as to execute the method as explained above for winding a winding material from a supply device on a winding body having a non-circular cross section.

The regulation unit may be implemented in hardware form and/or also in software form. In the case of a hardware-based implementation, the regulation unit may be formed as a device or as part of a device, for example, as a computer or as a microprocessor or as a control computer. In the case of a software-based implementation, the regulation unit may be formed as a computer program product, as a function, as a routine, as part of a program code or as an executable object.

It is also an object of the invention to provide a winding machine for winding a winding material. The winding machine comprises a supply device for providing the winding material, a winding body, having a non-circular cross section, of a winding machine and a controller that has a regulation unit that is configured, during winding of the winding material provided from the supply device onto the winding body via at least one deflection roller, so as to set an actual winding tension of the winding material to a setpoint winding tension depending on a position-dependent compensation signal, stored in a storage unit, for compensating a changeable free length, resulting from the non-circular cross section of the winding material, of the winding material between the deflection roller and the winding body.

The embodiments and features described for the proposed method apply accordingly to the proposed controller and to the proposed winding machine.

Further possible implementations of the invention also include combinations of features or embodiments that have been described above or are described hereinafter with reference to the exemplary embodiments but have not been mentioned explicitly. In this case, a person skilled in the art will also add individual aspects as improvements or additions to the respective basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantageous refinements and aspects of the invention are the subject matter of the dependent claims and of the exemplary embodiments, described below, of the invention. The invention is explained in more detail below on the basis of preferred embodiments with reference to the attached figures, in which:

DETAILED DESCRIPTION OF THE EXEMPLARY EMBODIMENTS

In the figures, identical or functionally identical elements have been provided with the same reference signs, unless indicated otherwise.

Figure 1:
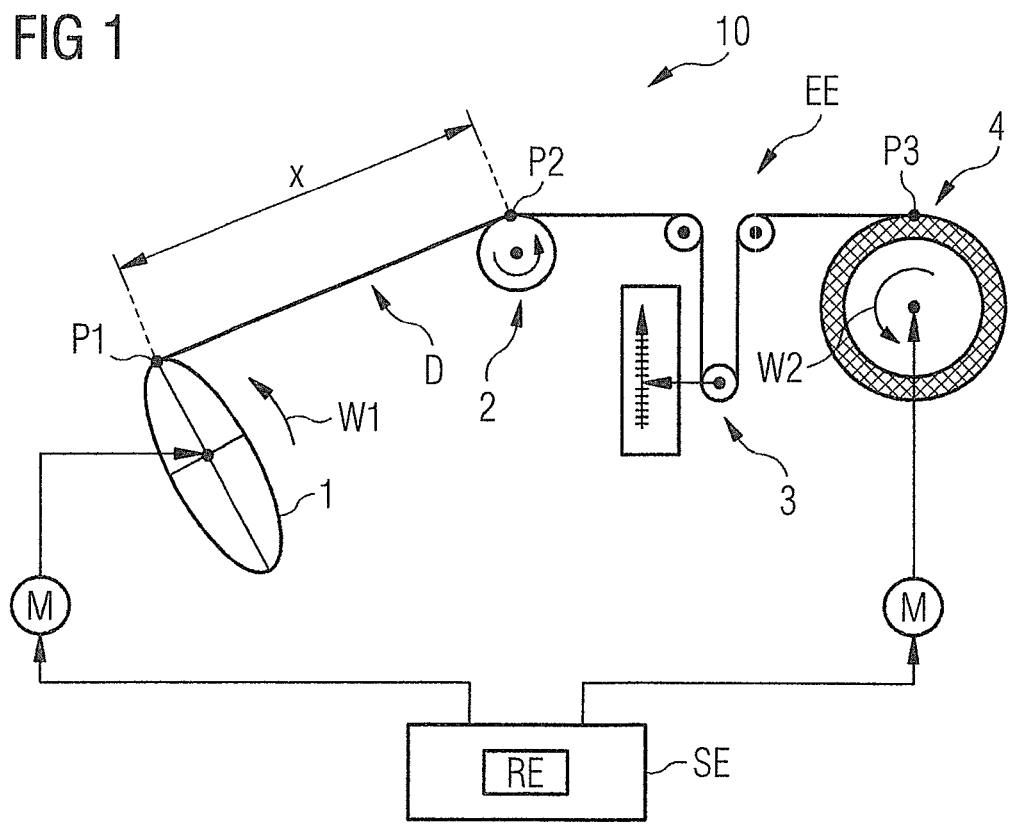
FIG. 1 shows a schematic view of one exemplary embodiment of a winding machine.

FIG. 1 illustrates a schematic view of one exemplary embodiment of a winding machine 10.

Figure 2:
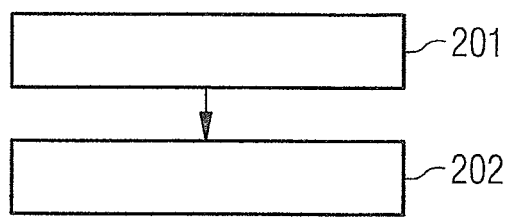
FIG. 2 shows a schematic flowchart of one exemplary embodiment of a method for winding a winding material from a supply roller on a winding body having a non-circular cross section.

FIG. 2 furthermore shows a schematic flowchart of one exemplary embodiment of a method for winding a winding material D from a supply roller 4 of the winding machine 10 onto a winding body 1 having a non-circular cross section. FIGS. 1 and 2 are explained with reference to one another below.

The winding machine 10 of FIG. 1 comprises a winding body 1, a deflection roller 2, a web store 3 and a supply roller 4. Here, the web store 3 acts as a setting unit EE. In addition or as an alternative, the setting unit EE may have a winding material brake or a winding material store.

The winding body 1 and the supply roller 4 can be driven via drives M. The drives M may be controlled or regulated by a controller SE. To this end, the controller SE has a regulation unit RE. The controller SE in particular controls or regulates the drives or motors M of the winding body 1 and/or of the supply roller 4. The winding body 1 rotates at a first rotational speed W1 during the winding procedure. The supply roller 4 rotates at a second rotational speed W2. The winding body 1 is wound around with the winding material D. The winding material D moves through the winding machine 10 at a predetermined speed. The winding material D has a particular winding tension during the winding procedure. The particular winding tension is set to a setpoint winding tension or intended winding tension using the drive M of the winding body 1 and using the drive M for the supply roller 4.

Here, the winding material D is guided from the supply roller 4 to the winding body 1 via a deflection roller 2. In this case, the winding material D is wound from the deflection roller 2 onto the winding body 1. In FIG. 1, in this case, P1 denotes the contact point of the winding material D on the winding body 1, P2 denotes the contact point of the winding material D on the deflection roller 2 and P3 denotes the contact point of the winding material D on the supply roller 4. The winding material D leaves the deflection roller 2 at the contact point P2. The winding material D makes contact with the winding body 1 at the contact point P1. The free length x extends between the contact point P1 and the contact point P2. The free length x corresponds to the length of the winding material D between the deflection roller 2 and the winding body 1. The free length x changes periodically during the winding procedure. Furthermore, the contact point P2 on the deflection roller 2 likewise changes periodically.

With reference to FIG. 2, in step 201, the winding material D is provided from the supply roller 4 (see FIG. 1).

In step 202, the winding material D provided from the supply roller 4 is wound on the winding body 1 via the deflection roller 2, where an actual winding tension of the winding material D is set to a setpoint winding tension depending on a position-dependent compensation signal k3 (see FIG. 3 and FIG. 4), stored in a storage unit 40, to compensate for the changeable free length x, resulting from the non-circular cross section of the winding material D, of the winding material D between the deflection roller 2 and the winding body 1. This setting may be controlling or regulating.

The position-dependent compensation signal is preferably calculated depending on a respective determined position $\alpha$ of the winding body 1 for a simulated winding cycle consisting of N rotations of the winding body 1 and then stored in a table of the storage unit.

Figure 3:
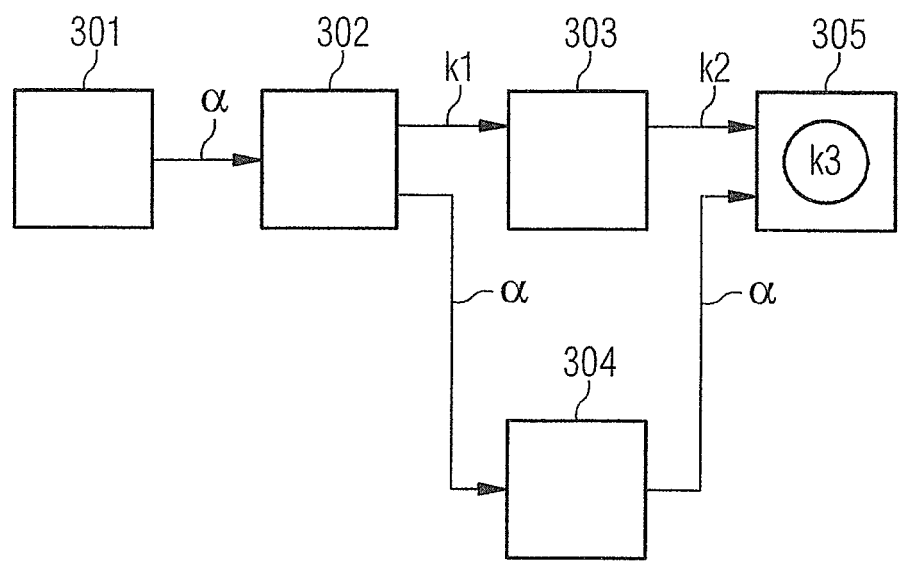
FIG. 3 shows a schematic block diagram of one exemplary embodiment of a method for calculating and storing a position-dependent compensation signal.

FIG. 3 illustrates a schematic block diagram of one exemplary embodiment of a method for calculating and storing a position-dependent compensation signal. In FIG. 3, k1 denotes the calculated compensation signal, k2 denotes the filtered compensation signal and k3 denotes the stored compensation signal.

With reference to FIG. 3, the method comprises steps 301 to 305, where in step 301, the respective position $\alpha$ of the winding body 1 for a simulated winding cycle consisting of N rotations of the winding body 1 is determined depending on a winding length of the winding material D and a rotational speed W1 of the winding body 1.

The exemplary embodiment of FIG. 3 comprises filtering (see step 304). Consequently, the respective position $\alpha$ of the winding body 1, in step 301, in addition to the winding length of the winding material D and the rotational speed W1 of the winding body 1, may be determined depending on a filter order of the filter in a predetermined resolution. A resolution may also be set without filtering. Depending on the set resolution and the filter order, the simulated winding cycle is preferably adjusted accordingly.

In step 302, the position-dependent compensation signal k1 is calculated depending on the respective determined position $\alpha$ of the winding body 1 prior to the winding material D being wound on the winding body 1. The position-dependent compensation signal k1 is a function of $\alpha$.

In step 303, the calculated position-dependent compensation signal k1 is filtered by a filter of the predetermined filter order prior to storage in the table (see step 305), and the filtered position-dependent compensation signal k2 is stored in the table of the storage unit as stored compensation signal k3. k3 and $\alpha$ are in particular stored in the storage unit 40 as pairs of values with the particular resolution.

The filter is in particular an FIR filter with the particular filter order of at least M and a finite impulse response.

In step 304, the filter dead time of the filter that is used in step 303 is taken into account for a temporal shift of the signal $\alpha$. In step 305, the filtered compensation signal k2 and the signal $\alpha$ for the position of the winding body 1 are thus synchronized with one another at the input side.

In step 305, the filtered position-dependent compensation signal k2, depending on the position signal $\alpha$, is stored in the table of the storage unit 40, where the transient response of the filter preferably is also taken into account in addition to the filter dead time.

After performing step 305, a stored compensation signal k3 is thus present in the storage unit 40, where the compensation signal is synchronized to the position $\alpha$ of the winding body 1 in the predetermined resolution.

Figure 4:
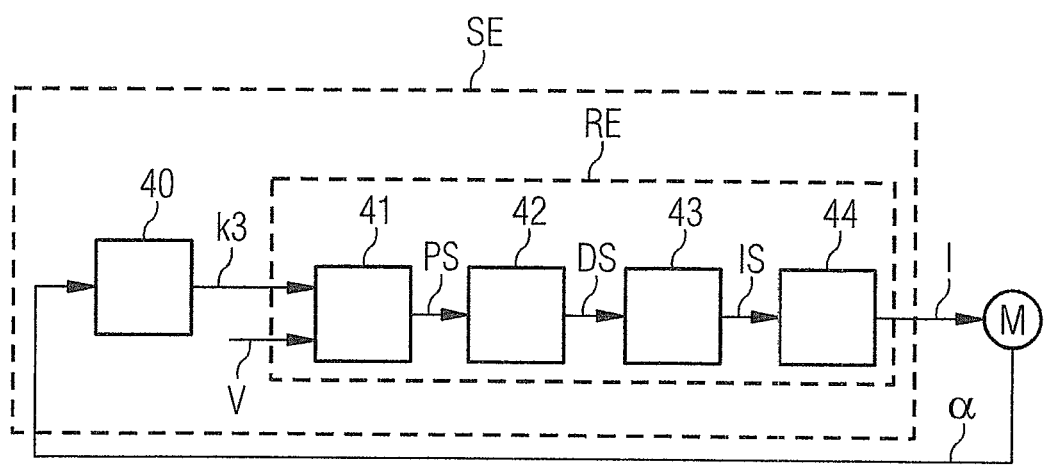
FIG. 4 shows a schematic block diagram of one exemplary embodiment of a controller for a winding machine.

FIG. 4 shows a schematic block diagram of one exemplary embodiment of a controller SE for a winding machine 10. The controller SE is configured so as to use a drive, for example, the drive M for the winding body 1 (see FIG. 1), to perform the method of FIG. 2.

The controller SE comprises a storage unit 40 for storing the compensation signal k3 (see, e.g., FIG. 3), and a regulation unit RE. The regulation unit RE comprises a calculation unit 41, a position regulator 42, a rotational speed regulator 43 and a current regulator 44.

The calculation unit 41 receives the current compensation signal k3 from the storage unit 40. "Current" refers here to the current value of the signal $\alpha$ for the position of the winding body. The calculation unit 41 furthermore receives a setpoint speed V for the winding material. The setpoint speed V for the winding material is, for example, 10 m/min.

At the output side, the calculation unit 41 provides a position setpoint value PS. The position regulator 42 receives the position setpoint value PS and provides a rotational speed setpoint value DS at the output side. The rotational speed regulator 43 receives the rotational speed setpoint value DS and provides a current setpoint value IS (or a torque setpoint value) at the output side, depending on the rotational speed setpoint value DS.

The current regulator 44 provides a current I at the output side, depending on the current setpoint value IS. The motor M is driven via the current I. As a result of the motor being driven via the current I, a current position $\alpha$ of the winding body 1 is given. This current position $\alpha$ serves in turn (in the feedback shown in FIG. 4) as an input value for the storage unit 40, so as to provide an updated compensation signal k3 at the output side. The current setpoint position $\alpha$ may also be used to obtain the updated compensation signal k3.

Although the present invention has been described on the basis of exemplary embodiments, it is able to be modified in many ways.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for winding a winding material from a supply device onto a winding body, having a non-circular cross section, of a winding machine, the method comprising:
   providing the winding material from the supply device; and
   winding the winding material provided from the supply device onto the winding body via at least one deflection roller;
   wherein an actual winding tension of the winding material is set to a setpoint winding tension depending on a position-dependent compensation signal, stored in a storage unit, for compensating a changeable free length, resulting from the non-circular cross section of the winding material, of the winding material between the at least one deflection roller and the winding body; and
   wherein the position-dependent compensation signal is calculated depending on a respective determined position of the winding body for a simulated winding cycle consisting of a number of rotations of the winding body and is stored in a table of the storage unit.

2. The method as claimed in claim 1, wherein the actual winding tension of the winding material is regulated to the setpoint winding tension depending on the position-dependent compensation signal for compensating the changeable free length of the winding material between the at least one deflection roller and the winding body.

3. The method as claimed in claim 2, wherein the position-dependent compensation signal is calculated depending on a respective determined position of the winding body for a simulated winding cycle consisting of a number of rotations of the winding body prior to the winding material being wound onto the winding body and is stored in a table of the storage unit.

4. The method as claimed in claim 1, wherein the position-dependent compensation signal is calculated depending on a respective determined position of the winding body for a simulated winding cycle consisting of a number of rotations of the winding body prior to the winding material being wound onto the winding body and is stored in a table of the storage unit.

5. The method as claimed in claim 4, wherein a polynomial table is utilized as the table for storing the position-dependent compensation signal.

6. The method as claimed in claim 1, wherein a polynomial table is utilized as the table for storing the position-dependent compensation signal.

7. The method as claimed in claim 1, wherein the respective position of the winding body for the simulated winding cycle consisting of the number of rotations of the winding body is determined depending on a winding length of the winding material and a rotational speed of the winding body.

8. The method as claimed in claim 1, wherein the calculated position-dependent compensation signal is filtered via a filter of a predetermined filter order prior to storage in the table; and wherein the filtered position-dependent compensation signal is stored in the table of the storage unit.

9. The method as claimed in claim 8, wherein an FIR filter with a particular filter order of at least M and a finite impulse response is utilized as the filter.

10. The method as claimed in claim 8, wherein the respective position of the winding body for the simulated winding cycle consisting of the number of rotations of the winding body is determined depending on a winding length of the winding material, on the rotational speed of the winding body and on the particular filter order of the filter in a predetermined resolution.

11. The method as claimed in claim 8, wherein a transient response of the filter is taken into account and a filter dead time of the filter is compensated when the filtered position-dependent compensation signal is stored in the table.

12. The method as claimed in claim 10, wherein a transient response of the filter is taken into account and a filter dead time of the filter is compensated when the filtered position-dependent compensation signal is stored in the table.

13. The method as claimed in claim 9, wherein the respective position of the winding body for the simulated winding cycle consisting of the number of rotations of the winding body is determined depending on a winding length of the winding material, on the rotational speed of the winding body and on the particular filter order of the filter in a predetermined resolution.

14. The method as claimed in claim 9, wherein a transient response of the filter is taken into account and a filter dead time of the filter is compensated when the filtered position-dependent compensation signal is stored in the table.

15. The method as claimed in claim 1, wherein the actual winding tension of the winding material is regulated to the setpoint winding tension depending on the position-dependent compensation signal for setting an actual tensile force acting on the winding material to a setpoint tensile force.

16. The method as claimed in claim 1, wherein an actual torque acting on the winding material is regulated to a setpoint torque.

17. The method as claimed in claim 1, wherein the actual winding tension of the winding material is regulated to the setpoint winding tension by at least one of (i) a rotational speed of the winding body and (ii) a setting unit.

18. A non-transitory computer program product encoded with a computer program which, when executed by a controller of a program-controlled apparatus, causes winding of a winding material from a supply device onto a winding body, having a non-circular cross section, of a winding machine, the computer program comprising:
   program code for providing the winding material from the supply device; and
   program code for winding the winding material provided from the supply device onto the winding body via at least one deflection roller;
   wherein an actual winding tension of the winding material is set to a setpoint winding tension depending on a position-dependent compensation signal, stored in a storage unit, for compensating a changeable free length, resulting from the non-circular cross section of the winding material, of the winding material between the at least one deflection roller and the winding body; and
   wherein the position-dependent compensation signal is calculated depending on a respective determined position of the winding body for a simulated winding cycle consisting of a number of rotations of the winding body and is stored in a table of the storage unit.

19. A controller for a winding machine, comprising:
   a regulation unit which is configured, utilizing at least one of (i) drives and (ii) a setting unit, the controller being configured to:

operate such that provide a winding material provided from a supply device; and operate such that the winding material provided from the supply device is wound onto the winding body via at least one deflection roller;

wherein an actual winding tension of the winding material is set to a setpoint winding tension depending on a position-dependent compensation signal, stored in a storage unit, for compensating a changeable free length, resulting from a non-circular cross section of the winding material, of the winding material between the at least one deflection roller and the winding body; and wherein the position-dependent compensation signal is calculated depending on a respective determined position of the winding body for a simulated winding cycle consisting of a number of rotations of the winding body and is stored in a table of the storage unit.

20. A winding machine for winding a winding material, comprising:

a supply device for providing the winding material;

a winding body having a non-circular cross section; and a controller having a regulation unit which is configured, during winding of the winding material provided from the supply device onto the winding body via at least one deflection roller, to set an actual winding tension of the winding material to a setpoint winding tension depending on a position-dependent compensation signal, stored in a storage unit, for compensating a changeable free length, resulting from the non-circular cross section of the winding material, of the winding material between the deflection roller and the winding body, and being further configured to calculate the position-dependent compensation signal depending on a respective determined position of the winding body for a simulated winding cycle consisting of a number of rotations of the winding body and is stored in a table of the storage unit.

* * * * *